(12) United States Patent
Sherwood

(10) Patent No.: US 6,512,796 B1
(45) Date of Patent: Jan. 28, 2003

(54) METHOD AND SYSTEM FOR INSERTING AND RETRIEVING DATA IN AN AUDIO SIGNAL

(76) Inventor: Douglas Sherwood, 3383 Marigold Cir., Costa Mesa, CA (US) 92626

( * ) Notice: Subject to any disclaimer, the term of this patent is extended or adjusted under 35 U.S.C. 154(b) by 0 days.

(21) Appl. No.: 09/082,395

(22) Filed: May 20, 1998

Related U.S. Application Data

(63) Continuation of application No. 08/890,533, filed on Jul. 9, 1997, now abandoned, which is a continuation of application No. PCT/US97/03517, filed on Mar. 3, 1997.
(60) Provisional application No. 60/012,749, filed on Mar. 4, 1996.

(51) Int. Cl.[7] .................. H04B 14/04; H04B 17/00; H04H 9/00
(52) U.S. Cl. .................. 375/242; 455/67.1; 455/2
(58) Field of Search ............... 375/242; 455/2, 455/67.1; 725/19

(56) References Cited

U.S. PATENT DOCUMENTS

| | | | |
|---|---|---|---|
| 4,025,851 A | 5/1977 | Haselwood et al. | 325/31 |
| 4,230,990 A | 10/1980 | Lert, Jr. et al. | 455/67 |
| 4,805,020 A | 2/1989 | Greenberg | 358/147 |
| 5,450,490 A | 9/1995 | Jensen et al. | 380/6 |
| 5,579,124 A | 11/1996 | Aijala et al. | 386/96 |
| 5,719,937 A | * 2/1998 | Warren et al. | 360/60 |
| 5,774,452 A | * 6/1998 | Wolosewicz | 370/212 |
| 5,787,334 A | 7/1998 | Fardeau et al. | 455/2 |
| 5,822,360 A | * 10/1998 | Lee et al. | 370/493 |

FOREIGN PATENT DOCUMENTS

| JP | 63-69398 | 9/1986 |
|---|---|---|
| JP | 1-236760 | 9/1989 |

* cited by examiner

Primary Examiner—Don N. Vo
(74) Attorney, Agent, or Firm—Schweitzer Cornman Gross & Bondell LLP

(57) ABSTRACT

A method and apparatus for encoding data into an audio signal and subsequently extracting the data comprises combining the data signal and a chosen interval of the audio signal in a manner in which the data signal is essentially inaudible. The data signal preferably includes synchronization data to assist in identifying the data in a composite data and audio signal. In a preferred embodiment, digital data is combined with a digitized audio signal in a bit-wise manner, the amplitude of each data bit being individually chosen to be decodable when passed through a particular receiver. Alternative insertion location along the length of a given audio segment may be compared to identifying a preferred insertion location. To extract the data signal from the resulting composite signal the composite signal is digitized, preferably passed through a bandpass filter, and compared on a bit-wise basis with the known pattern of the synchronization data. Correlation with the synchronization data identifies the data signal which can then be extracted in its entirety.

13 Claims, 6 Drawing Sheets

FIG. 1
1001 1011 0101.... ...... 1000 1101 1010
⎵_____⎵  ⎵_____⎵
    bits 1-24          bits 25-60
FIG. 1a
       D D D D D D S D S D...   S D S D D D D D D D
       ⋮     ⋮             ⋮          ⋮
bit   1    6           47       60
FIG. 2
FIG. 4a
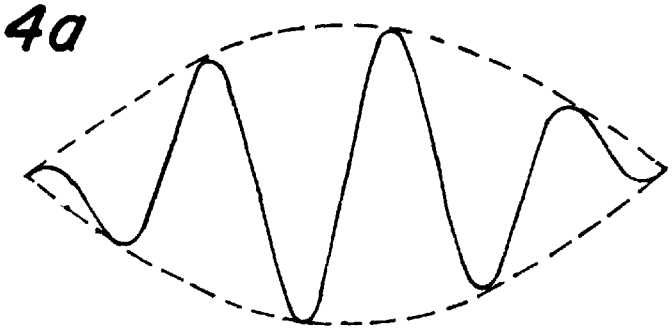

METHOD AND SYSTEM FOR INSERTING AND RETRIEVING DATA IN AN AUDIO SIGNAL (This application is a Continuation of U.S. patent application Ser. No. 08/890,533 abandoned as of Jul. 9, 1997 which is a Continuation of Patent Cooperation Treaty Application No. PCT/US97/03517, filed Mar. 3, 1997 which claims priority of U.S. Provisional Application Ser. No. 60/012,749, filed Mar. 4, 1996)

BACKGROUND OF THE INVENTION

The transmission and reception of audio information pervades our environment. Radio broadcasts and the audio channel of television broadcasts issue virtually unending streams of audio. Audio recordings are manufactured, distributed and played back on a variety of equipment. Entire industries exist for the creation and dissemination of such products.

The maintenance of records concerning the transmission and reception of such audio data is a daunting task which is faced in various forms by numerous entities. Broadcasters are required to keep logs of their transmissions. Both individual stations and their affiliated networks need to know, for example, that a particular sponsor's promotion or "spot", for which the station and network have received revenue, was in fact broadcast in accordance with the agreement with the sponsor. Similarly, the sponsor and/or its advertising agency require assurances that the sponsor has received full value for its payment, and that its spot was broadcast by the contracted-for station or stations, at the contracted time or times, in its entirety.

Producers and distributors of audio recordings can obtain valuable marketing data from the analysis of the time and frequencies of broadcast of their releases. Such data can be of particular value in the analysis of the efficacy of promotional efforts for a particular artist or recording in a particular market. Licensing organizations can use frequency-of-broadcast data in their royalty disbursement calculations.

Traditional methods for the collection and auditing of broadcast data has been both laborious, time-intensive, and costly. Typically, a monitoring organization would monitor the transmission of a station of interest and manually record the identity of a particular broadcast segment and its air time. The continuous monitoring of a station requires the continuous presence of a listener. If more than one station is to be monitored, additional monitoring personnel are required. While the recordation of broadcasts are sometimes utilized for subsequent review, current methodology still requires the playback and monitoring of the recording, and thus serves only to time-shift the monitoring process, without effecting its actual duration. It has been estimated that an overall accuracy of no more than 70% typically results from conventional monitoring methodologies.

Various methods have been proposed to automate the auditing process. Such proposals have included the monitoring of a broadcast for a particular audio "signature", which would correspond to a known signature for a given broadcast segment. Such methods have met with only limited success.

To be of value, an automated system for audio signal recognition and identification must be essentially inaudible to at least the typical listener. It also must be "robust", providing a high degree of accuracy and being capable of detection after the audio track with which it is employed has passed through any of the variety of transmission and processing media and equipment typically utilized in conventional broadcasts. It also should be relatively immune from detection or modification.

BRIEF DESCRIPTION OF THE INVENTION

The above and other objectives and purposes are met by the present invention, which masks a stream of digital data with a primary audio signal in a manner which does not perceptively change the quality of the primary audio signal. The combined composite signal is capable of recordation and transmission over a wide range of media, and demonstrates a high degree of covertness.

The digital format data stream to be inserted is preferably divided into a plurality of strings of a chosen length, and each of the strings is algebraically added or "inserted," on a bit-by-bit basis, with the audio program material along a determined portion of the program material, the portion being chosen to maximize the covertness of the inserted data. In order to facilitate the subsequent identification and extraction of the inserted data, each insertion may comprise, in addition to chosen data, which may for example be specific to the program material, synchronization data of a consistent format which is searched for as part of the decoding process and which identifies the insertion of the digital data string.

The particular portion of the program material along which a data string is inserted is preferably determined by a process whereby the data string to be inserted is algebraically added with the audio program along each of a plurality of potential portions or sites within a given longer segment of the audio program. At each potential data bit insertion location along a particular portion of the program material, the amplitude required for each inserted bit is individually determined so that the audio program signal at that bit location will not cause an incorrect detection of that bit (i.e., a one detected as a zero or a zero detected as a one) when an attempt is made to extract the inserted data bit at the receiver. A series of tests is applied to each of the resulting composite signal portions, and the results of the tests are compared to determine which of the alternative portions produces a composite signal best demonstrating sufficient covertness. It has been found that one meaningful covertness criterion is the consideration of signal energy of the composite signal in particular frequency bands, over an interval of time equal to the insertion interval, with smaller energy deviations from that of the original signal indicating increasing covertness. Another meaningful covertness criterion has been found to be the extent of deviation of energy of the original signal from its mean value in a particular frequency band over the same time interval, with smaller deviations from the mean indicating increasing covertness.

Once the optimal location for the data string is found along a given segment or interval of the audio program and the insertion is performed, a next audio segment can be chosen for possible data insertion. Potential insertion portions are again identified and tested with the data string to be inserted therealong. The testing and insertion process can be repeated as desired through a series of potential insertion portions, and with data to be inserted, across any chosen total duration or extent of the audio program material.

The inserted digital data is retrieved from the composite signal by processing the composite signal, such as by filtering, to first eliminate portions of the signal which are unrelated to the inserted data. The remaining signal is compared to the known synchronization data pattern present in each insertion to identify the portion of the received signal which includes the inserted data string. The identification of the synchronization data pattern allows the remaining portion of the data string to be located and retrieved for subsequent processing. In a preferred embodiment, the composite audio signal is digitized, bandpass-filtered, matched-filtered, and threshold-detected. The detected bits are passed in a step-wise manner through a shift register which allows the composite signal to be compared on a step-wise, bit-by-bit basis with the sync data pattern. With use of a data signal of known length, the data bits can then be identified from their positional relationship to the identified sync data, and thus can be extracted and processed.

BRIEF DESCRIPTION OF THE DRAWINGS

A fuller understanding of the present invention, and the features and characteristics thereof can be obtained upon consideration of the following detailed description of a preferred, but nonetheless illustrative embodiment thereof when reviewed in conjunction with the annexed drawings, wherein:

FIG. 1 is a representation of a representative data stream intended to be embedded in an audio track in accordance with the present invention;

FIG. 1a is a representation of a preferred arrangement of synchronization and data bits in a data string;

FIG. 2 is a representation of a portion of a data string in a biphase modulation format;

FIG. 4a is a depiction of a bit in a sinusoidally-weighted biphase-modulation format, while FIG. 4b is a frequency-domain plot of the bit in FIG. 4a;

DETAILED DESCRIPTION OF THE INVENTION

Figure 3:
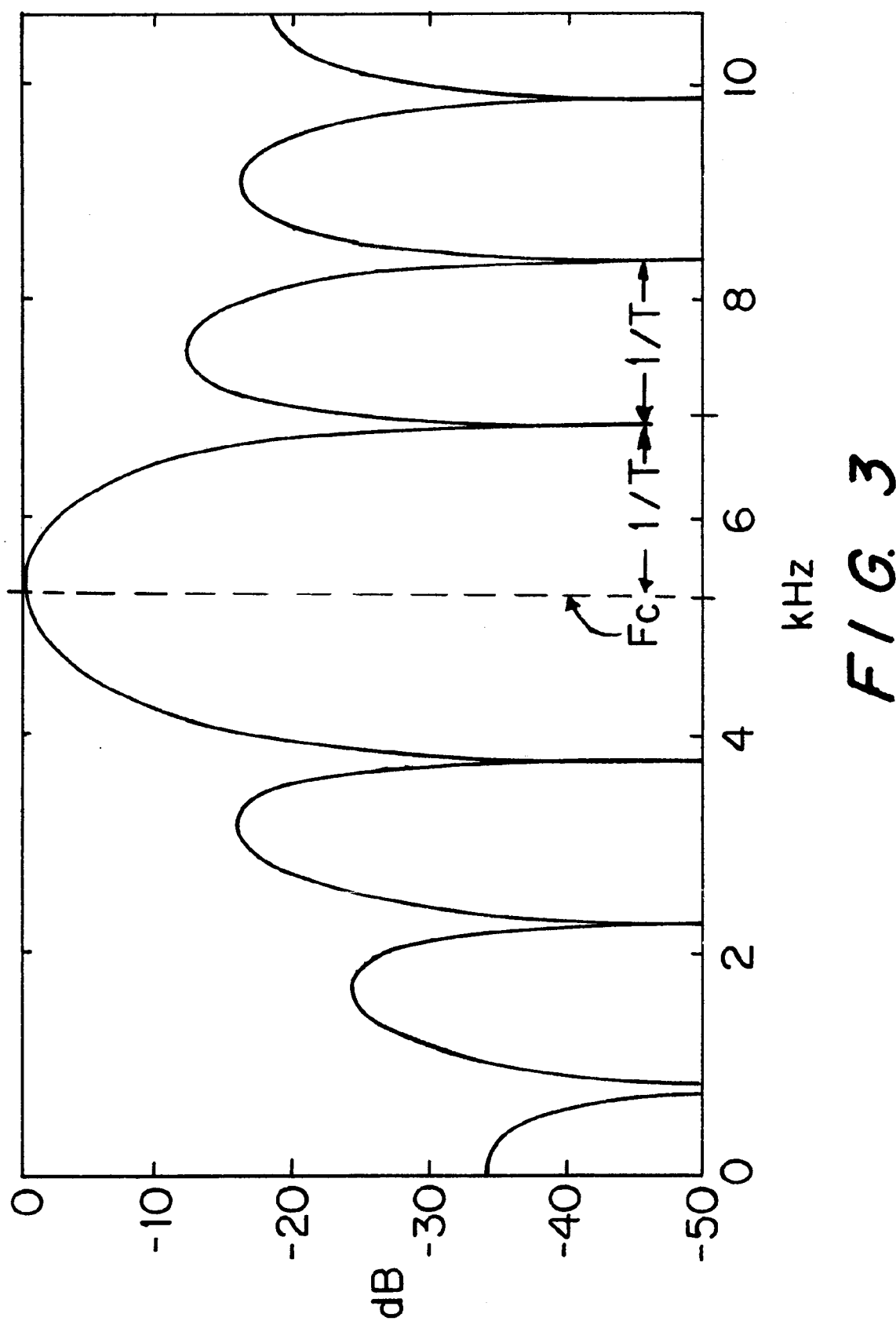
FIG. 3 is a frequency-domain plot of a phase-shift keyed burst signal of fundamental frequency $F_c$ with a bit interval of T seconds.

As depicted in FIG. 1, data which is intended to be embedded in an audio signal in accordance with the present invention is preferably in the form of a binary data string 10 of a chosen fixed length. In a preferred embodiment of the invention, the data string 10 may be 60 bits in length, comprising 24 bits of synchronization data 12 and 36 bits of information data 14. The synchronization data is placed at a given location on the string, the information data filling the remaining locations. The synchronization data string is further of a fixed, known pattern, chosen as known in the art to enable the locating of the information data, while the information data is typically of "random" content. The information data may be constant, or may vary from data string to data string, either because each data string is intended to carry varying information, or because the amount of constant information to be encoded extends beyond the space allocated to information data in a single string. For broadcast audio identification purposes, such information could include a coded identification of the program material. In such a case, the information may merely be repeated in each string, it being intended that data strings be embedded along the entire length of the associated audio track.

As shown in FIG. 1, the synchronization data 12 may be the leading portion of the data string, although it can be at other locations, and can be broken into parts along the data string. In a preferred embodiment, as shown in FIG. 1a, the synchronization bits S may be interleaved with data bits D so that every pair of sync bits has one data bit between them. The remaining 13 data bits (36 total–23 interleaved) are divided into two groups, with a group of six bits immediately preceding the synchronization pattern, and the remaining seven bits immediately following. In order to facilitate combining the data string 10 with the analog audio signal, the data string may be converted to a biphase modulated waveform string 16 of a chosen audio frequency as shown in FIG. 2. As known in such a modulation technique, the waveforms for digital "1s" (18) and "0s" (20) have a phase difference of 180 degrees, such that the resulting signal for the data consists of a series of fixed-frequency sinusoidal bursts each of fixed duration T differing only in their relative phase. Known demodulation techniques are available for converting such signals back into digital data.

Although the time domain representation of the phase-encoded signal for a bit is a single-frequency signal of frequency $F_c$ over the interval T, in the frequency domain the signal has the characteristics shown in FIG. 3. As shown therein, the data burst frequency spectrum has an energy maxima at center frequency $F_c$ corresponding to the frequency $F_c$ of the sinusoid (here 5333.3 Hz), with subsequent lesser maxima extending at frequencies both above and below the center frequency. The energy minima on either side of the peak maxima at $F_c$ are located at a series of frequencies equal to $F_c \pm n/T$ (n=1,2, . . . ) with the first maximas being approximately 13 db below the peak energy of the center frequency component. Consideration of the frequency domain is important, since the total energy of the data burst signal is seen to spread across a range of frequencies. As the available bandwidth associated with certain transmission media may be limited, it may be of value that the energy of the data waveform to be inserted be maximized at one or more frequencies which comfortably fit within the available bandwidth range.

Figure 4B:
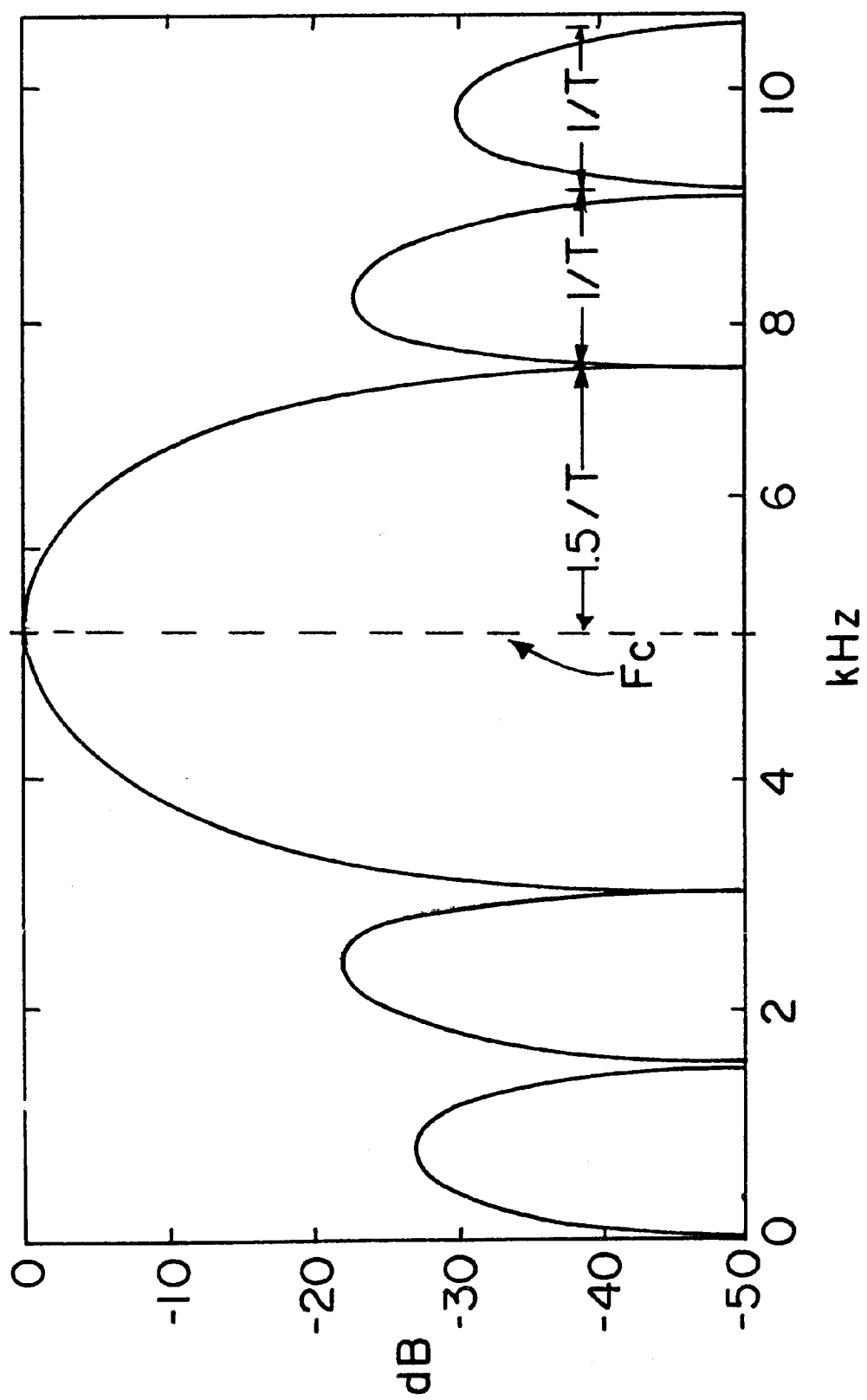

A bit in a biphase-modulated bit stream can be thought of as a sinusoid (the carrier) multiplied by a rectangular pulse that is either positive or negative, depending on the value of the bit. The use of a rectangular pulse is sometimes referred to as "rectangular weighting". In order to lessen the division of energy of the inserted data across a plurality of frequencies, the use of half-sinusoid weighting is currently preferred. As known in the art, such a technique envelops the fixed-frequency burst with a sinusoidal envelope, as shown in FIG. 4a. The resulting frequency domain representation for the signal is shown in FIG. 4b. While the harmonic maxima are somewhat greater displaced from the center frequency $F_c$, the first harmonic maxima are depressed approximately 20 db below the peak of central lobe. Thus, a greater proportion of the total energy content is located at the central lobe at $F_c$. As shown in FIG. 4a, 3.5 cycles of the carrier are enveloped by a sinusoid having a period equal to twice the duration of the burst to be enveloped.

When the specific locations along the audio signal for combining the audio with the digital data bits are chosen in accordance with the present invention, and the digital data bits—in their carrier modulated form—are algebraically added to the audio, the resulting composite signal is substantially indistinguishable from the original signal and thus can be transmitted, broadcast and received without listener perception that, in addition to the perceived audio, a data track is present.

In order to determine the appropriate positions for data insertion within a continuously varying audio program, the phase-modulated data string to be inserted is "tested" at a plurality of positions within a referenced length of audio. Accordingly, the audio program material is initially divided into segments of a chosen, predetermined duration into each of which a data string 16 is intended to be inserted. Typically, the length of the audio signal is chosen such that the data string to be inserted can be tested at a plurality of alternative positions. In a presently preferred embodiment of the invention, the segment duration is one second. In order to conveniently combine the data string with the audio signal, the audio signal segment itself may be digitized or segmented. The bits of the data string can then be combined algebraically with a corresponding segment of the digitized audio signal to yield the encoded composite signal. A chosen sampling or digitizing frequency for the audio program of 32 kHz, a center frequency $F_c$ for the sinusoidally-weighted biphase-modulated data bits of 5333.3 hertz, and a bit length of 3.5 cycles of carrier at $F_c$ is presently contemplated.

An entire data signal of 60 bits in length is tested against successive 60 insertion location portions of the selected audio segment to determine, of the alternative locations available therein, which location provides sufficient covertness for the inserted data while still allowing the encoded data to be retrieved at the receiver location. In accordance with an aspect of the present invention, covertness can be characterized as a function of energy gain of the combined signal in certain frequency bands; the smaller the energy gain, the greater the covertness.

In order to determine the energy values of the alternative insertions for purposes of comparison, the insertion methodology includes the replication of the decoder mechanism to be used at the receiver at the insertion point. The program audio signal to which the data stream is to be added is passed through the replicated decoder by itself to determine an output "profile" when no data signal is present. The output of the decoder may then be used to compute the amplitude required of each modulated bit of data to be added such that, when the composite signal in that bit location is passed through the actual receiver detector, a correct determination will be made with respect to the presence and value for that bit. The process of determining bit amplitude may include incorporation of a safety margin to allow for anticipated distortions that the composite signal may experience before processing by the receiver. This safety margin would be tailored to the individual application. Once the needed amplitude for each bit in the 60-bit data string is determined and the data string combined with the audio in accordance with the determined formula, an energy analysis of the composite signal portion is performed. The energy analysis allows a relative covertness value for the sum total of the necessary amplitude adjustments to be calculated.

Determination of the necessary amplitude for each data bit proceeds on a bit-by-bit incremental basis through a proposed 60-bit location set in a one second audio track insertion interval. A first location set is identified, and the audio program signal present at the intended location of the first bit of data in the location set is passed through the receiver-equivalent circuitry implemented as part of the insertion system. The magnitude and polarity of the signal appearing at the output of the receiver due to the presence of audio program signal is noted. Since the output of the receiver due to an inserted data bit of unit amplitude is a determined known value, and since the receiver-equivalent circuitry is linear, it is a simple matter, and well known in the art, to compute the amplitude required of the inserted bit to overcome the "interference" at the output of the receiver due to the program signal. The computed amplitude may be zero. This would occur, for example, whenever the polarity at the output of the receiver due to the program signal is the same as the polarity that would be produced by an inserted data bit. In other words, so long as the program material produces a response at the output of the receiver that is the desired response due to an inserted bit, it is not necessary to modify the program material by addition of a bit signal. However, in a practical system where distortions are to be encountered between data insertion and extraction, it is important that the amplitude of a bit signal never be zero. To accommodate such distortions, in a preferred embodiment no bit signal has an amplitude smaller than 0.2 times the largest amplitude in the insertion interval. The required amplitude of each data bit is computed on a bit-by-bit basis until all 60 amplitudes have been computed.

The set of required amplitude values needed to successfully decode each of the 60 bits is then stored in memory along with their corresponding insertion locations within the audio track insertion interval. A next location set for the proposed insertion is then identified, typically by incrementing the starting location by a desired value, and the entire 60-bit insertion is repeated, again computing the needed amplitude for each data bit on a bit-by-bit basis until the entire 60-bit sequence can be fully demodulated. In a preferred embodiment, the increment corresponds to 60 degrees of phase of the 5333.3 Hz carrier, or 1/32,000 second. The procedure is repeated until a full data insertion at each available 60-bit location set commencing along the entire length of the insertion interval is performed.

Figure 5:
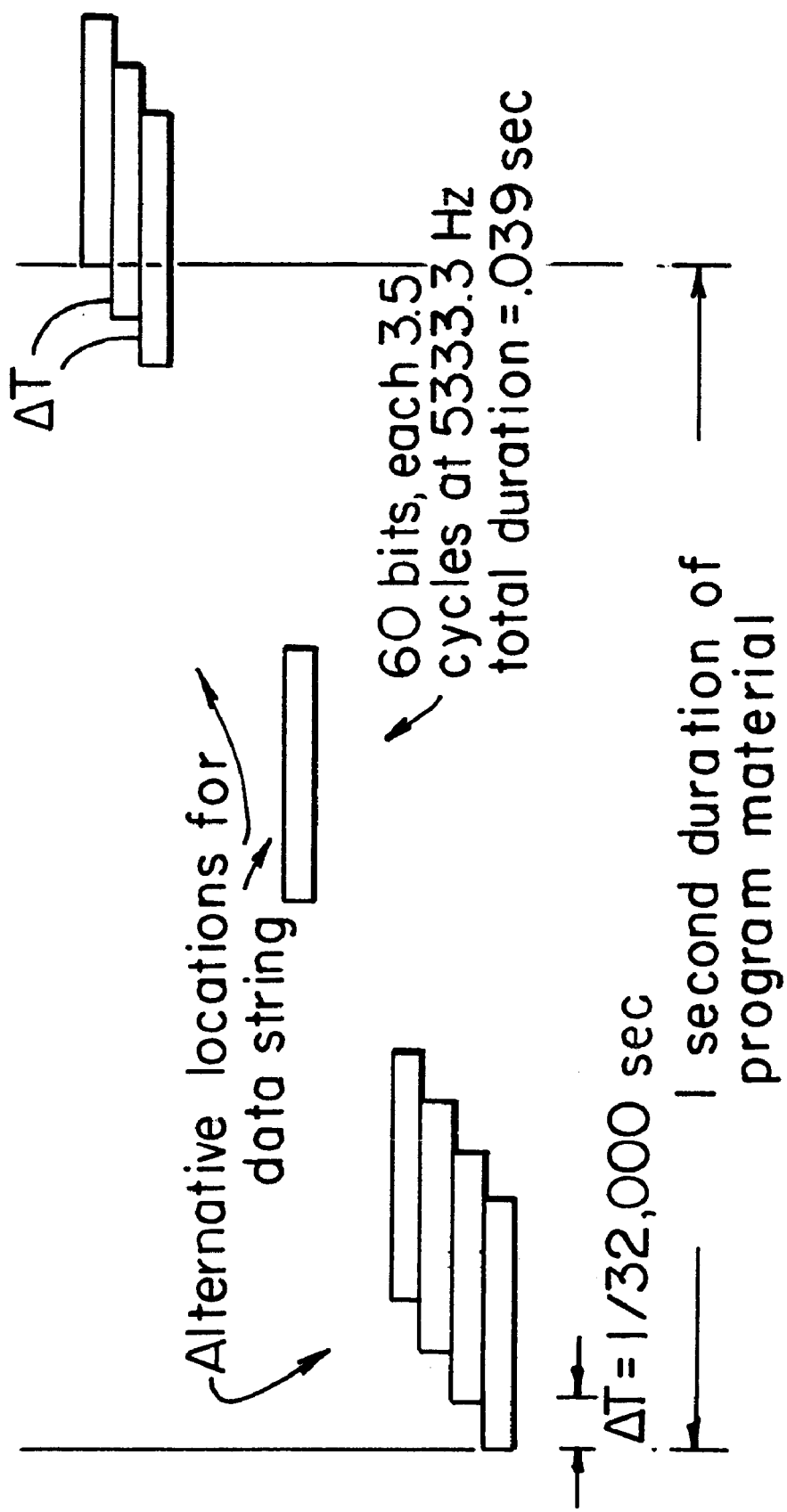
FIG. 5 is a representation (not to scale) of the alternative locations for insertion of a data string in an audio program segment.

The foregoing is depicted in FIG. 5. As shown therein, a 1-second interval 100 of the audio program is capable of receiving a starting bit of 60-bit data string 102, each bit being 3.5 cycles in duration at 5333.3 Hz, at 32,000 alternative locations, where the offset T between successive starting locations is 1/32000 second.

In order to avoid having to store and test thousands of amplitude value sets (in the preferred embodiment 32,000 sets for a 1 second duration of audio program), a preliminary test may be performed on a set of amplitude values to reduce the number of sets to be stored. The test consists of computing the total energy of the insertion from the amplitude values, and comparing this energy to the energy of the audio program signal alone over the insertion interval. The comparison may be over a frequency range or band corresponding to the frequency width of the main lobe of the data signal. If the ratio of total energy to audio program energy exceeds a certain value, the amplitude set is discarded. In the presently preferred embodiment this ratio is 4:1.

Once a matrix of insertion amplitude value sets is created for all the possible location sets of an insertion interval, the methodology of the present invention calls for the analysis of each set of amplitude values to determine which set, overall, adds the minimum amount of energy to the original audio signal. This analysis can preferably be performed in certain frequency bands. The set having minimal added energy is chosen for actual insertion into the audio signal for transmission.

As a first measurement of energy, the mean or average energy in two frequency bands over the 60 insertion points can be calculated. While consideration of the energy added by a particular insertion is a measure of its relative covertness, guidelines can be developed to further insure that the "best" insertion location meets minimal requirements for covertness. It has been found, for example, that the ratio of composite signal energy to program material energy in each of the frequency bands over the duration of the insertion should be less than four, in order to have a combined signal in which the added data signal is "inaudible". In addition, the energy of the program material alone should be above another, fixed threshold, to avoid insertion locations in which there is no or little program material. Currently, this criteria is met by having the average energy for the program material to be no more than 70 db below the nominal peak energy of the material. It is only when these two criteria are met for a given insertion location set that the set remains viable for comparison against other candidates.

In addition, it has been found experimentally that, as a result of the wide variability of audio program material, a choice of insertion point calculated solely upon an analysis of mean energy may be in some circumstances insufficient to identify the preferred location for data insertion. Accordingly, additional tests of the energy value of the insertion can be performed. A presently preferred energy analysis consists of several calculations.

Figure 6:
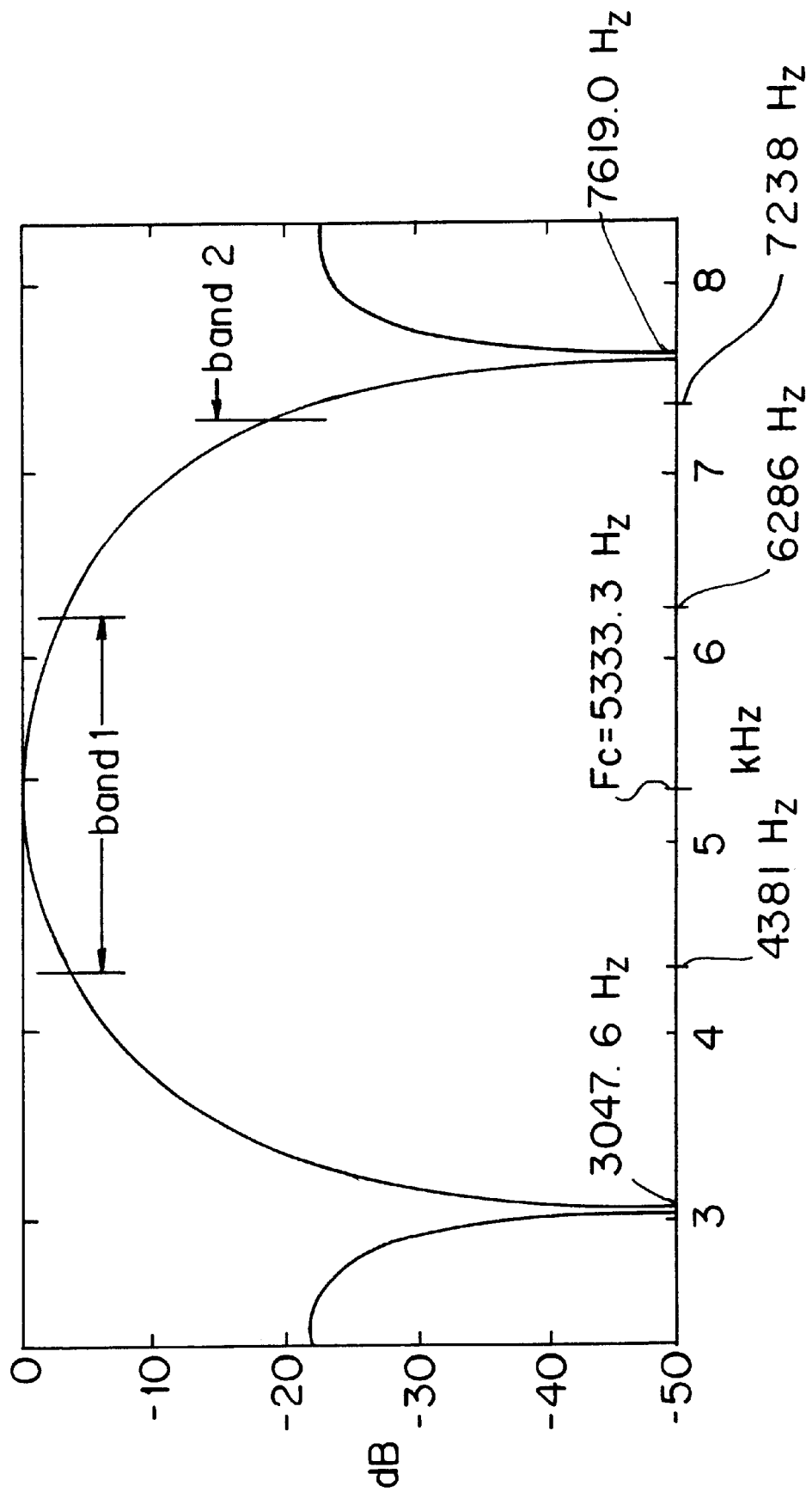
FIG. 6 is a detailed representation of a portion of a frequency-domain plot of a preferred sinusoidally-weighted biphase-shift-keyed signal utilized in the present invention.

FIG. 6 depicts the central portion of the frequency spectrum for a sinusoidally-weighted biphase-modulated signal having a center frequency of 5333.3 Hz and a repetition rate of 1523.8 bps (bits per second). A first calculation determines the mean energy ratio between the composite signal and the audio program material alone over a frequency band centered on the center frequency and extending from 4381 to 6286 Hz. A second energy calculation computes the ratio of the standard deviation of energy to energy of the program signal in that frequency band. It has been found that such a ratio allows the system to discriminate against audio signals having a high harmonic content, such as are present in certain musical passages. A third calculation determines the energy ratio between the composite signal and program material alone over a band extending from 6286 Hz to 7238 Hz.

Benchmark criteria can be set for the results of each of these tests. For a set of insertion points to be further tested for viability, the energy ratio over the first band (4381–6286 Hz) should be less than 4, while the standard deviation ratio in the same band should be less than 1.6. When employed, the energy ratio over the second band (6286–7238 Hz) should also be less than 4. For the sets of insertion points which meet each of the criteria, a further comparison between sets is performed to identify the optimal location. The values for each insertion are compared to each other, and the location having the best overall figures is designated. In the preferred embodiment, the insertion candidate with the minimum sum-of-squares of the three ratios is chosen.

Providing for data insertion at one-second intervals can provide redundancy over the extended course of an audio program. It is possible, however, to have multiple insertions within a one-second interval. In general, the greater the number of insertions the greater the likelihood that the overall audio quality of the original program may be modified sufficiently such that some "difference", albeit undefined, from the original source may be able to be perceived. It has been found that a maximum of one insertion per second of audio provides an acceptable compromise between the amount of data able to be inserted and the risk of audio signal degradation as a result of "excessive" insertion.

Figure 7:
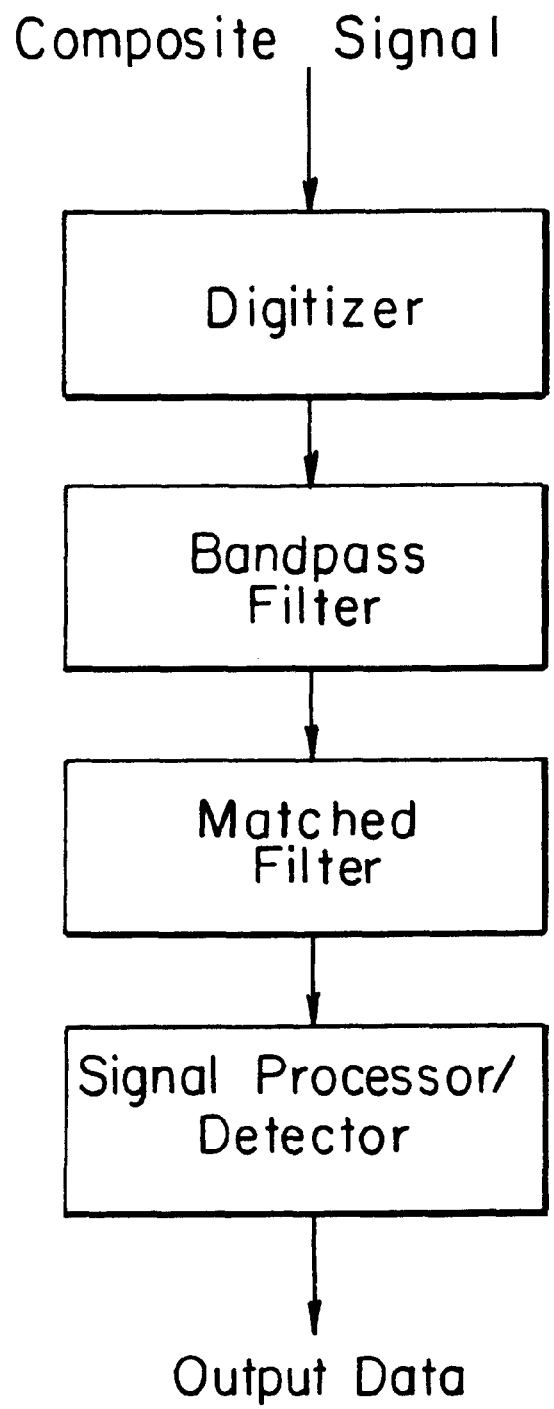
FIG. 7 is a block diagram of a receiver of the present invention.

A receiver in accordance with the present invention is depicted in FIG. 7. As shown therein, the composite signal 20 is digitized by digitizer 22, at a sample rate of at least twice the highest frequency of interest in the spectrum of the inserted signal. In the present embodiment, the sample rate is 16 kHz. The digitized signal is then passed through an appropriate bandpass filter 24 chosen to pass at least the highest energy portion of the frequency spectrum of the modulated data signal. For the preferred embodiment, the frequencies passed would include those of the main lobe shown in FIG. 4b; all other frequencies would be excluded. For a data signal subject to sinusoidally-weighted biphase-shift keying, the signal is then passed through a matched filter 28, as known in the art. Such a filter has a frequency response which closely replicates the spectrum of the bit, and further tailors the received signal to maximize the information content of the signal portion to be analyzed.

The next step in the demodulation process is to sample the output of the matched filter at a time corresponding to the width and timing for passage of an entire bit through the matched filter. If the sample, for example, is of "positive" value or voltage, a "one" bit is detected, if the sample is of "negative" value or voltage, a zero bit is detected. Such a method is well known in the art. It is important, however, that the filter output sampling be precisely coordinated with data bit passage. To determine the correct sample times, and to demodulate the data, the matched-filter output is passed to a signal processor/detector 26.

The matched-filter output is analyzed by the detector to locate the sync data. This is performed by inspecting, on a step-wise basis, the matched-filter output to determine if the synchronization data is present, indicating that an embedded data string has been located. This inspection may be done by passing the matched-filter output across an analysis window of a width corresponding to at least the sync data portion of the 60-bit width of a data string, and inspecting the appropriate portions thereof for the existence of the known sync bit pattern. As may be appreciated, it is necessary that the location of the data string in the continuous composite signal be determined with precision to allow proper inspection and identification of both the sync and accompanying data bit portions.

To aid in locating the sync pattern and detecting the data, the sampling rate at the output of the matched filter is increased by the signal processor/detector to a rate high enough to insure that at least one sample corresponds closely enough in time to the correct sampling instant for each bit to insure accurate detection. In the preferred embodiment, this sample rate is 64,000 samples per second (42 samples per bit). The process of sample rate conversion is well known in the art. After sample rate conversion the samples are "detected", that is, for example, positive samples are converted to logical ones and negative samples are converted to logical zeros, whereby a data train is produced.

After sample rate conversion and detection, the process of locating the synchronization pattern can preferably be performed by passing the data train through a shift register, as known in the art, synchronized to the increased 64kHz sampling rate. The "bins" of the shift register are 42 samples wide, corresponding to the full width of each inserted data bit. The "length" of the shift register is chosen to span the length of the synchronization data portion of the data string. Taps are spaced at intervals along the shift register corresponding to the temporal spacing between individual bits of the synchronization pattern at insertion. At each shift of the register, the tap outputs are compared to the known synchronization data pattern. When a high correlation is found, it is assumed that the remaining bits in the 60-bit sequence represent the transmitted data portion of the data string. In the preferred embodiment, a perfect match with the sync word pattern is required. Assuming the shift register is long enough to encompass the complete 60-bit data sequence, the data string can be obtained by merely providing shift register taps at cells spaced appropriately relative to the synchronization bit taps.

The data string data may itself include test and error correction bits, subject to procedures as known in the art, whereby the integrity of the data may be determined. The use of such error correction methodology is encouraged, as it is possible that the audio signal alone may, in certain circumstances, replicate the synchronization bits. Error checking within the data field will substantially minimize the risk of such "false positives" carrying artificial "data" into the processing stream.

Because of the robustness of the insertion methodology of the present invention, it is possible for data to be embedded in an audio track early on in the distribution chain. Information can be added, for example, to a master tape recording, and will be carried forward through transmission and duplication processes which may occur prior to an ultimate broadcast of the track. The subsequent broadcast can be received and decoded with results equivalent to usage of the master recording for broadcast purposes.

Certain processes utilized particularly in the radio broadcast industry, however, subject audio tracks to time compression or time expansion prior to broadcast. Such techniques have the effect of varying the apparent frequencies of the audio to which the processing is applied, thus shifting the frequency spectrum of the inserted data signal and consequently affecting the ability of a receiver and filter system of the present invention to isolate the particular frequency band or bands in which the embedded data is located.

In order to combat this problem, the receiver may be provided with a set of parallel processing paths each in accordance with FIG. 7. Each path includes a bandpass filter 24 and a matched filter which are tuned to a different center frequency, the frequencies and passbands of the filters being chosen to extend across the possible variation in frequency resulting from the broadcast time compression or expansion. The outputs of the decoding process for each of the parallel paths may be compared to determine which path corresponds to the compression or expansion utilized. This procedure is known in the art as "Doppler bin searching".

I claim:

1. A method for combining a digital format data signal with an audio signal, comprising the steps of:
   1) choosing a portion of the audio signal into which the data signal is intended to be inserted, said portion being of a duration greater than that of the data signal;
   2) choosing a plurality of proposed alternative starting locations along the audio signal portion for the insertion;
   3) commencing at each starting location, identifying an audio signal length segment corresponding to the length of the data signal and segmenting the signal length segment into a series of subsegments, each of a length corresponding to the length of a bit of the data signal;
   4) individually adjusting the magnitude of each bit of the data signal and combining the data signal and each audio signal length segment in a data signal bit-wise manner such that the data signal can be completely retrieved when passed through a given decoder; and
   5) identifying the signal length segment and corresponding adjustments to the data signal bits which maximizes the covertness of the data signal in the combined signal.

2. A method for the recovery of digital data from a composite signal formed of the combination of an audio signal and a modulated digital data signal, said digital data signal including a known data portion, comprising the steps of:
   digitizing the composite received signal;
   sampling the composite signal at a multiple of the bit rate of the digitized data signal;
   comparing the sampled signal on a bit-wise basis to the bit structure of the known data portion, and
   identifying the bit structure of the digital data as the bit structure of a corresponding length of said sampled signal when the structure of the known data portion is correlated to bit structure of an equivalent portion of the sampled signal.

3. The method of claim 2 including the step of filtering the digitized composite signal to pass that portion of the digitized composite signal comprising a significant portion of the modulated digital data signal prior to sampling thereof.

4. The method of claim 3 comprising the further step of incrementing the starting location for the comparison step across the length of a portion of the composite signal and repeating the comparison step from each starting location.

5. The method of claim 4, wherein said starting location incrementing step increments the starting location by a distance corresponding to a fraction of the length of the bit width of the digitized data signal.

6. A method for the combining of a digital data signal with an audio signal for the transmission thereof and subsequently recovering the data signal therefrom, comprising the steps of:
   1) choosing a portion of the audio signal into which the data signal is intended to be inserted, said portion being of a duration greater than that of the data signal;
   2) choosing a plurality of proposed alternative starting locations along the audio signal portion for the insertion;
   3) commencing at each starting location, identifying an audio signal length segment corresponding to the length of the data signal and segmenting the signal length segment into a series of subsegments, each of a length corresponding to the length of a bit of the data signal;
   4) individually adjusting the magnitude of each bit of the data signal and combining the data signal and the audio signal length segment in a data signal bit-wise manner such that the data signal can be completely retrieved when passed through a given decoder;
   5) identifying the signal length segment and corresponding adjustments to the data signal bits which maximizes the covertness of the data signal in the combined signal;
   6) combining the adjusted data signal with the identified signal length segment to yield a combined signal;
   7) transmitting the combined signal to a remote receiver;
   8) digitizing the received combined signal;
   9) sampling the combined signal at a rate corresponding to a multiple rate of the digitized data signal;
   10) comparing the sampled signal on a bit-wise basis to the bit structure of the known data portion; and
   11) identifying the bit structure of the digital data as the bit structure of a corresponding length of said sampled signal when the structure of the known data portion is correlated to a bit structure of an equivalent portion of the sampled signal.

7. The method of claim 1, further including the step of converting the data signal into a biphase modulated waveform prior to the step of combining the data signal and the audio signal segments.

8. The method of claim 1, wherein said segmenting the signal length segment into a series of sub-segments is performed at a frequency of about 32 KHz.

9. The method of claim 7, wherein said step of converting the data signal to a biphase modulated waveform is performed at a center frequency of 5333.3 Hz with a bit length of 3.5 cycles.

10. The method of claim 1, wherein the step of choosing a plurality of proposed alternative starting locations comprises choosing a first proposed starting location and successively incrementing the position of the first proposed location by no more than the length of a data signal bit to create subsequent proposed alternative starting locations.

11. The method of claim 1, wherein said step of identifying the audio signal length segment which maximizes the covertness of the data signal comprises a comparison of energy gain of the combined data signal and audio signal length segment over the energy of the corresponding audio signal length segment and identifying the audio signal length segment associated with the least of such gain.

12. The method of claim 11, wherein said step of comparing energy gain includes passing the combined signal through a decoder;

digitizing the composite received signal;

sampling the composite signal at a multiple of the bit rate of the digitized data signal;

comparing the sampled signal on a bit-wise basis to the bit structure of the known data portion, and identifying the bit structure of the digital data as the bit structure of a corresponding length of said filtered signal when the structure of the known data portion is correlated to the bit structure of an equivalent portion of the sampled signal.

13. The method of claim 10 wherein the incrementing is at a phase angle of about 60°.

* * * * *